United States Patent
Jeswine et al.

(10) Patent No.: US 7,311,162 B2
(45) Date of Patent: Dec. 25, 2007

(54) APPARATUS AND METHOD FOR TRAVERSING COMPOUND CURVED AND OTHER SURFACES

(75) Inventors: William W. Jeswine, Seattle, WA (US); Frank Dailey, Seattle, WA (US); Eric Olsen, Lynnwood, WA (US); Cameron Raymond Cox, Washougal, WA (US)

(73) Assignee: Skywalker Robotics, Inc., Seattle, WA (US)

( * ) Notice: Subject to any disclaimer, the term of this patent is extended or adjusted under 35 U.S.C. 154(b) by 0 days.

(21) Appl. No.: 11/413,646

(22) Filed: Apr. 27, 2006

(65) Prior Publication Data

US 2007/0029125 A1    Feb. 8, 2007

Related U.S. Application Data

(62) Division of application No. 11/197,063, filed on Aug. 3, 2005, now abandoned, which is a division of application No. 10/823,325, filed on Apr. 13, 2004, now abandoned, which is a division of application No. 09/946,780, filed on Sep. 4, 2001, now Pat. No. 6,742,617.

(60) Provisional application No. 60/235,065, filed on Sep. 25, 2000.

(51) Int. Cl.
*B62D 63/02* (2006.01)

(52) U.S. Cl. .................. 180/164; 180/8.3; 180/901

(58) Field of Classification Search ............... 180/164, 180/14.1, 8.3, 8.4, 8.5, 901
See application file for complete search history.

(56) References Cited

U.S. PATENT DOCUMENTS 3,268,023 A    8/1966  Napoli, Jr. et al.
3,653,455 A    4/1972  Hetteen
3,777,834 A   12/1973  Hiraoka
3,926,277 A   12/1975  Shino et al.
3,955,642 A    5/1976  Shino et al.
3,958,652 A    5/1976  Urakami et al.
4,029,164 A *  6/1977  Urakami ................ 180/164
4,095,378 A    6/1978  Urakami
4,345,658 A    8/1982  Danel et al.
4,735,432 A    4/1988  Brown (Continued)

FOREIGN PATENT DOCUMENTS

EP            407745           1/1991

(Continued)

OTHER PUBLICATIONS

International Search Report, Jun. 18, 2002 relating to application No. PCT/US01/30013.

*Primary Examiner*—Kevin Hurley
(74) *Attorney, Agent, or Firm*—Graybeal Jackson Haley LLP

(57) ABSTRACT

A traction unit capable of traversing and turning on surfaces that include compound curves like the surface of a sphere or are inverted like a ceiling. The traction unit includes a plurality of trucks operable to propel the unit across a surface and a plurality of adherence members operable to releasably secure the unit to the surface. In operation, the adherence members cyclically attach to and release from the surface as the trucks propel the unit across the surface. Within each cycle, after the unit has traveled a predetermined distance relative to an attached member, the member releases the surface and reattaches to the surface at a different point.

7 Claims, 15 Drawing Sheets

U.S. PATENT DOCUMENTS

| | | |
|---|---|---|
| 4,785,902 A | 11/1988 | Ochiai |
| 4,878,451 A | 11/1989 | Siren |
| 4,971,591 A | 11/1990 | Raviv et al. |
| 5,161,631 A | 11/1992 | Urakami |
| 5,220,869 A | 6/1993 | Pelrine et al. |
| 5,284,096 A | 2/1994 | Pelrine et al. |
| 5,351,773 A | 10/1994 | Yanagisawa |
| 5,441,443 A | 8/1995 | Roberts |
| 5,487,440 A | 1/1996 | Seemann |
| 5,588,900 A | 12/1996 | Urakami |
| 5,667,429 A | 9/1997 | Uchida |
| 5,839,532 A | 11/1998 | Yoshiji et al. |
| 6,079,510 A | 6/2000 | Miyamoto |
| 6,102,145 A | 8/2000 | Fisher |
| 6,145,611 A | 11/2000 | Haddad |
| 6,276,478 B1 | 8/2001 | Hopkins |
| 6,964,312 B2 | 11/2005 | Maggio |

FOREIGN PATENT DOCUMENTS

| | | |
|---|---|---|
| GB | 1-527-632 | 10/1978 |
| GB | 2248428 A | 4/1992 |
| GB | 2268457 | 1/1994 |
| JP | 60-35676 | 2/1985 |
| JP | 61-119478 | 6/1986 |
| JP | 62-214070 | 9/1987 |
| JP | 2-95989 | 4/1990 |
| JP | 4-115039 A | 4/1992 |
| JP | 4-257750 | 9/1992 |

\* cited by examiner

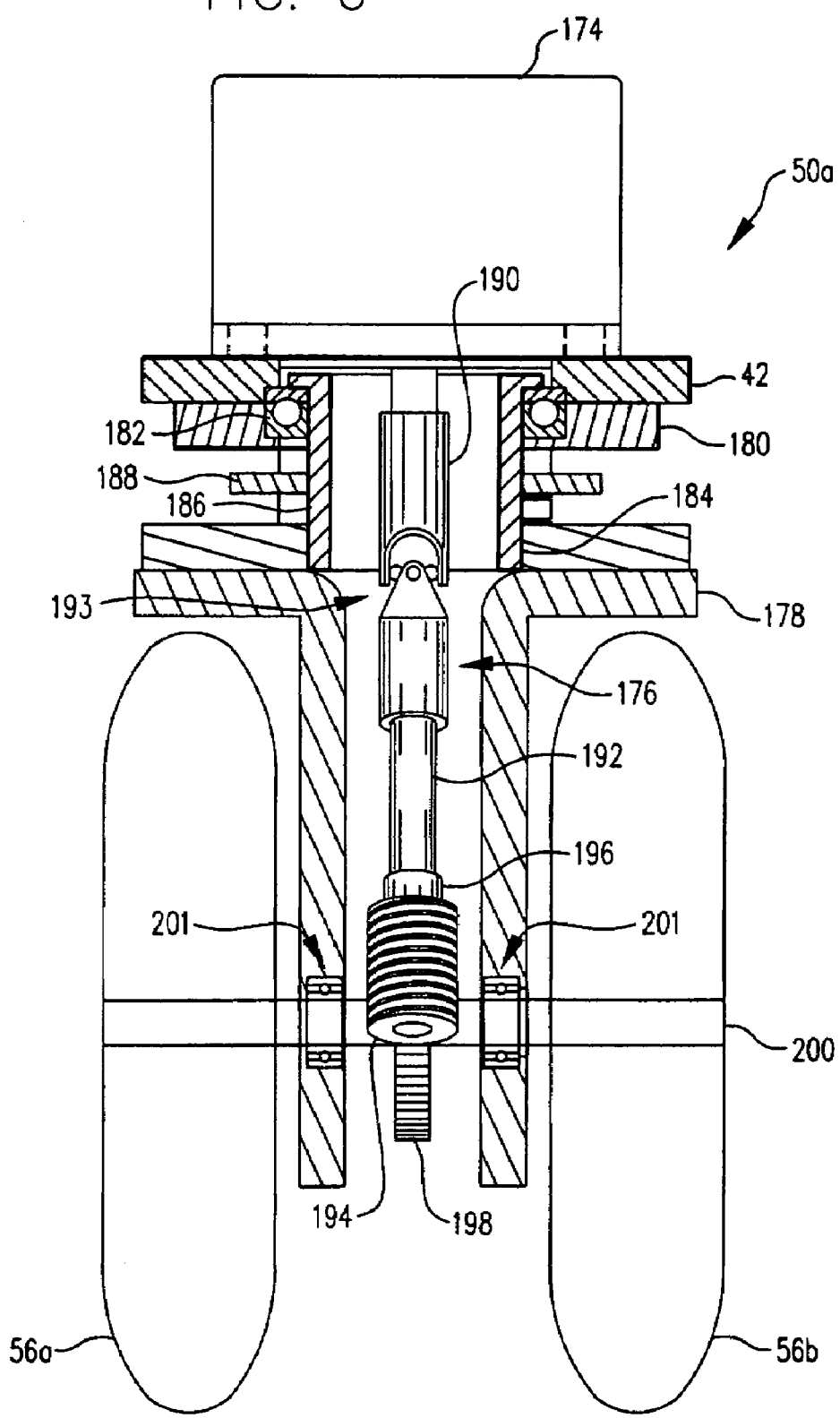

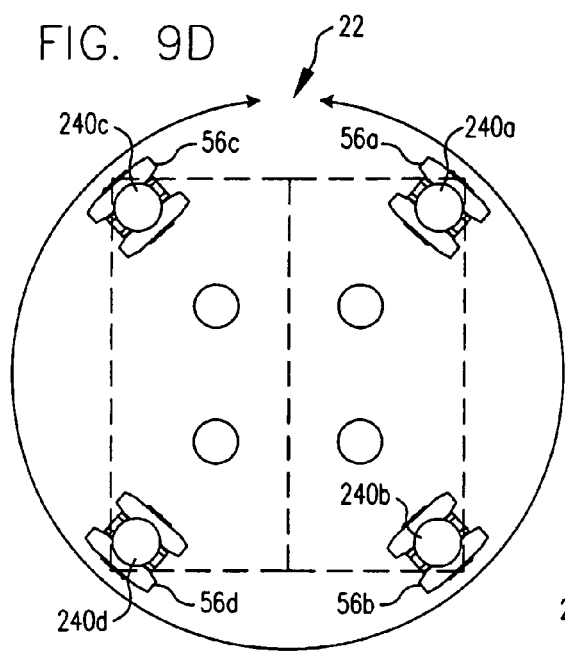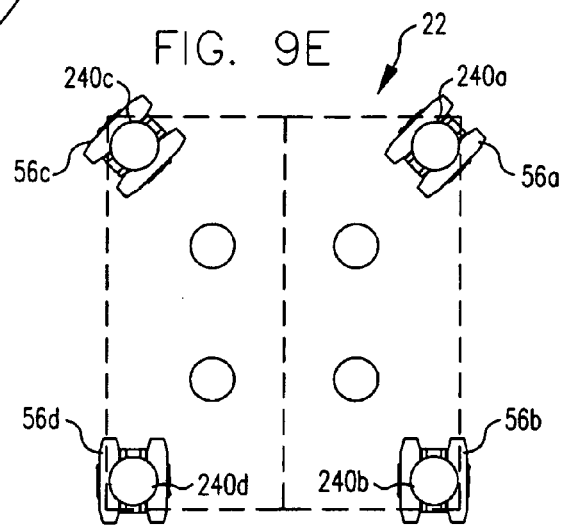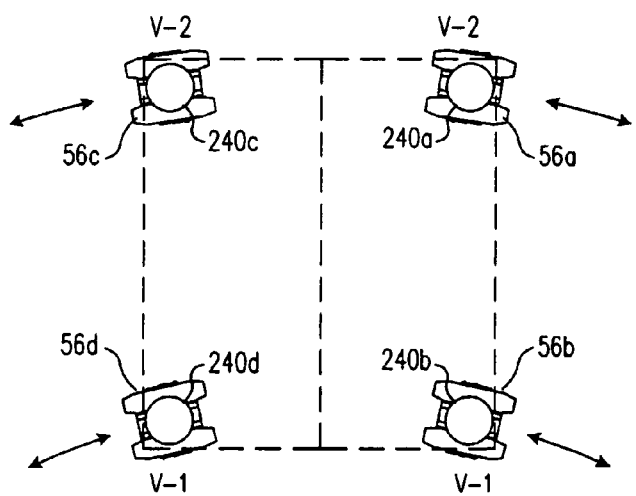

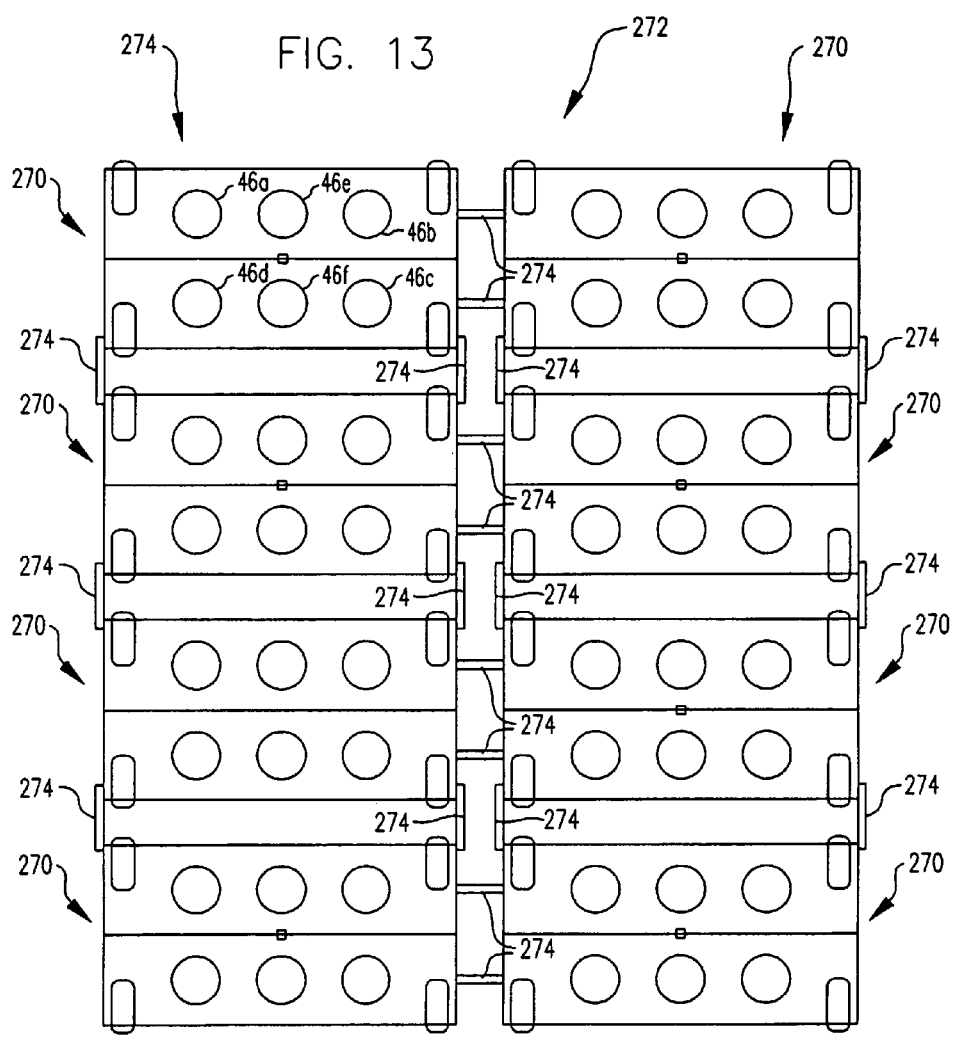

APPARATUS AND METHOD FOR TRAVERSING COMPOUND CURVED AND OTHER SURFACES

CROSS REFERENCE TO RELATED APPLICATIONS

The instant application is a divisional application of U.S. patent application Ser. No. 11/197,063, titled "Apparatus And Method For Traversing Compound Curved And Other Surfaces", filed 3 Aug. 2005 now abandoned, which is a divisional application of U.S. patent application Ser. No. 10/823,325, titled "Apparatus And Method For Traversing Compound Curved And Other Surfaces", filed 13 Apr. 2004, now abandoned which is a divisional application of U.S. patent application Ser. No. 09/946,780, titled "Apparatus And Method For Traversing Compound Curved And Other Surfaces", filed 4 Sep. 2001 and is now U.S. Pat. No. 6,742,617, and the instant application claims priority from U.S. Provisional Patent Application 60/235,065, titled "Robotic System for Traversing Surface", filed 25 Sep. 2000, all of which are hereby incorporated by reference in their entirety.

TECHNICAL FIELD

This invention relates generally to unmanned, self-propelled vehicles and more particularly to a vehicle such as a robot and methods for traveling across and turning on a surface with compound curves.

BACKGROUND

People frequently use unmanned, self-propelled vehicles such as robots to perform a variety of functions that would be difficult or dangerous for a person to perform. For example many people frequently use robots to retrieve or dispose an explosive device or inspect or work in an environment that could kill or injure a person. People also frequently use robots to inspect or work in locations that typically are hard to access or are inaccessible by a person such as inspecting a pipeline.

Unfortunately, because robots typically propel themselves to a work site, use of most conventional unmanned, self-propelled vehicles is typically significantly limited by the ability of the robot to propel itself over a surface. For example, surfaces that include compound curves or three dimensional curves, abrupt inclinations or declinations, steps or gaps can cause conventional robots to become significantly less stable, i.e., more likely to lose their preferred orientation relative to the surface, as they traverse the surface or turn on it. In addition, surfaces that are slippery can cause conventional robots to easily lose a significant portion, if not all, of their traction to the surface. If either happens while traversing an incline or inverted surface such as a ceiling, such a loss of traction could cause the robot to fall. Such a fall could seriously damage the robot, its payload if it has any, or the surface or other components of the structure the robot is traversing.

Another problem with conventional robots is they tend to scrub the surface as they traverse and turn on it. This can cause undesirable scratches on the surface. For example, the skin or windshield of a commercial airplane must remain free from scratches because of the high stress imposed on it during flight. If a scratch does occur, the skin or windshield is often replaced at great expense in both time and money.

Yet another problem with conventional robots is they tend to bounce or jerk as they propel themselves across a surface. This can be a significant problem during inspection of, for example, a commercial airplane's crown skin or structure—the top part of the airplane's body—because most inexpensive non-destructive inspection techniques require the inspection apparatus to remain a substantially constant distance from the surface being inspected. Because of this requirement, most inspections of an airplane typically include erecting a scaffold, which can be time consuming, for an inspector to stand on prior to inspecting the structure.

SUMMARY

In one aspect of the invention, a traction unit includes a frame, a plurality of trucks attached to the frame and operable to propel the frame across a surface, and a plurality of adherence members attached to and movable relative to the frame and operable to releasably secure the frame to the surface. Each adherence member includes a foot attached to a body that is operable to extend the foot toward the surface and retract the foot from the surface. The traction unit also includes a plurality of corresponding return mechanisms attached to the frame and operable to move the adherence members to respective return positions. With the adherence members merely attaching the unit to the surface and the trucks merely propelling the unit across the surface, the unit can traverse and turn on compound curved surfaces.

In another aspect of the invention, a control unit makes sure that at least one adherence member is attached to the surface while the unit traverses the surface.

BRIEF DESCRIPTION OF THE DRAWINGS

FIG. 6 is a front cross-sectional view of a truck included in the traction unit in FIG. 1 according to an embodiment of the invention.

FIGS. 9A-9F are views of a traction unit included in the traction unit system of FIG. 1 performing three types of turns according to an embodiment of the invention.

FIG. 13 is a top view of a train of traction units including two rows of traction units linked side by side according to another embodiment of the invention.

DETAILED DESCRIPTION

Figure 1:
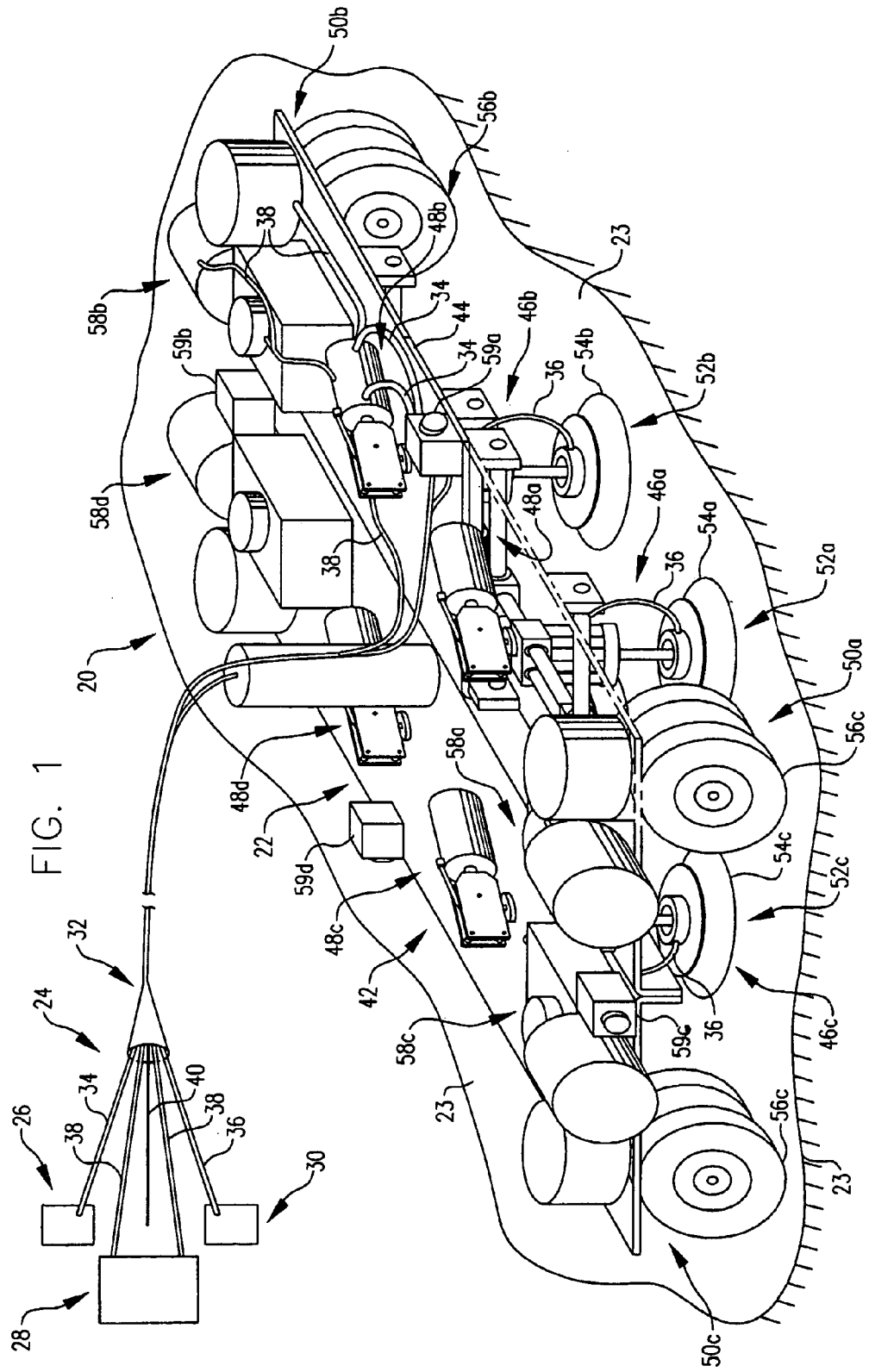
FIG. 1 is a perspective view of a traction unit system according to an embodiment of the invention.

FIG. 1 is a perspective view of a traction unit system according to an embodiment of the invention. The traction unit system is capable of turning on and traversing across compound curved surfaces—surfaces curved in three dimensions such as the surface of a sphere or the like—with little or no surface scrubbing or abrasion.

Referring to FIG. 1, the system 20 includes a traction unit 22 operable to traverse a surface 23, a pneumatic system 24 including a source of pressured air 26 for powering some or all of the components of the traction unit 22, a control system 28 including a micro-processor (not shown) for instructing and coordinating the operation of some or all of the components of the traction unit 22, a vacuum source 30 and an umbilical cord 32 that includes pneumatic 34, vacuum 36 and electrical lines 38 connecting the appropriate components to the source of pressurized air 26, vacuum source 30 and control system 28, and a tether 40 operable to suspend the traction unit 22 above a surface 23.

The traction unit 22 includes a frame 42 having a lead portion 44 that typically indicates the direction of travel when the unit 22 is traversing a surface 23, adherence members 46a-46d (46d not shown) attachable and moveable relative to the frame 42 for releasably securing the frame 42 to the surface 23 or lifting the frame 42 away from the surface 23, return mechanisms 48a-48d attachable to the adherence members 46a-46d for moving the members 46a-46d to a return position, and trucks 50a-50d (50d not shown) rotatably or fixedly attachable to the frame 42 for propelling the unit 22 over and maintaining the frame 42 a constant or approximately constant distance away from the surface 23.

The adherence members 46a-46d attach the traction unit 22 to the surface 23 and include an adherence foot 52a-52d (52d not shown) that each member 46a-46d extends to and retracts from the surface 23 for this purpose. The adherence feet 52a-52d include a suction cup 54a-54d (54d not shown) that is connected to the vacuum source 30 by the vacuum lines 36. Although the feet 52a-52d are shown and discussed as including suction cups 54a-54d, the feet may include magnets or other conventional mechanisms that can attach to and release from a surface. The adherence members 46a-46d can extend their adherence feet 52a-52d below a plane (not shown) defined by the points on the surface 23 where the trucks 50a-50d contact the surface 23 or retract the adherence feet 52a-52d above the same plane. This allows the adherence members 46a-46d to secure the traction unit 22 to surfaces that undulate within the area covered by the frame 42 of the traction unit 22. This also allows the traction unit 22 to suspend the trucks 50a-50d off the surface 23 to change direction quickly and without scrubbing the surface 23. Although the system 20 includes four adherence members 46a-46d, the traction unit 22 may include more or fewer adherence members.

The trucks 50a-50d propel the traction unit 22 across the surface 23 and include wheels 56a-56d (56d not shown). The trucks 50a-50d typically do not attach the traction unit 22 to the surface 23. The trucks 50a-50d are typically located at the corners of the traction unit 22 while the adherence members 46a-46d are typically located within the corners for greater stability. Although, the trucks 50a-50d and adherence members 46a-46d can be arranged differently.

The traction unit 22 also includes steering mechanisms 58a-58d that can steer each truck 50a-50d independently or steer two or more trucks together, and obstruction sensors 59a-59d.

Still referring to FIG. 1, in operation, the adherence members 46a-46d repeatedly attach to and release from the surface 23 as the wheels 56a-56d of the trucks 50a-50d propel the frame 42 across the surface 23. Although the operation of one adherence member 46a is discussed, the other adherence members 46b-46d operate in a similar manner. At a first moment in the movement cycle (the first moment is not necessarily first but simply picked as an arbitrary first moment for discussion purposes) the adherence member 46a hangs from the frame 42 above the surface 23 and extends the adherence foot 52a to the surface 23. This is the return position and typically occurs when the return mechanism 48a has stopped moving the adherence member 46a. With the adherence member 46a attached to the surface 23, the frame 42 moves relative to the adherence member 46a as the wheels 56a-56d accelerate the frame 42 across the surface 23, propel the frame 42 at a constant or substantially constant speed, or otherwise move the frame. After, the frame 42 moves a predetermined distance relative to the member 46a, the adherence foot 52a releases its hold on the surface 23 and is retracted away from the surface 23. Next, the return mechanism 48a moves the released member 46a back to the return position where the member 46a extends the adherence foot 52a to once again attach to the surface 23 and repeat the cycle. In one embodiment, to help ensure that the frame 42 is secured to the surface 23 while it traverses the surface 23, the control system 28 coordinates the attachment and release of each member 46a-46d so that at least one of the members 46a-46d is attached to the surface 23 at all times.

Figure 10:
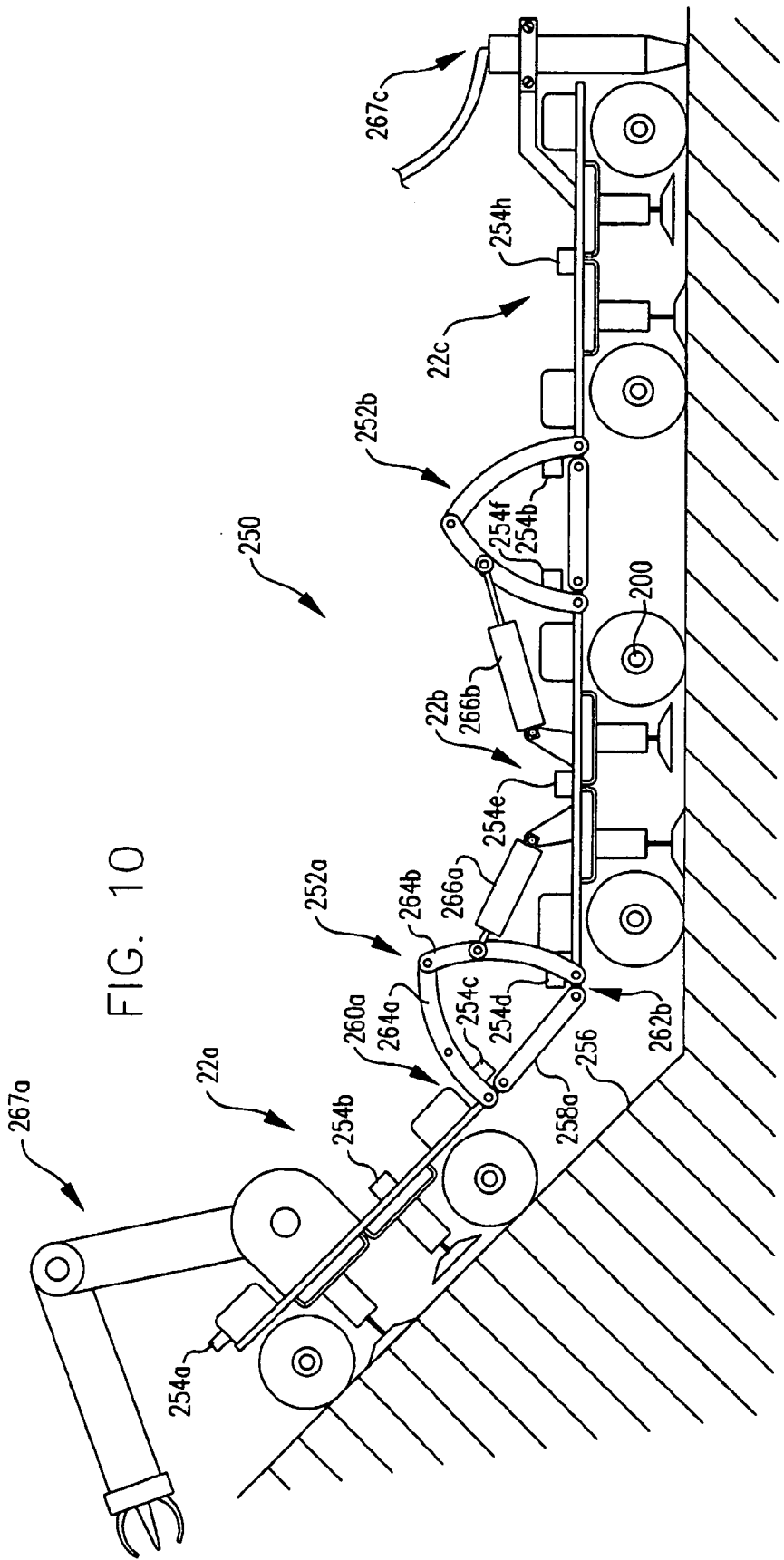
FIG. 10 is a side view of a train including three traction units in FIG. 1 traversing up an incline according to an embodiment of the invention.
Figure 11:
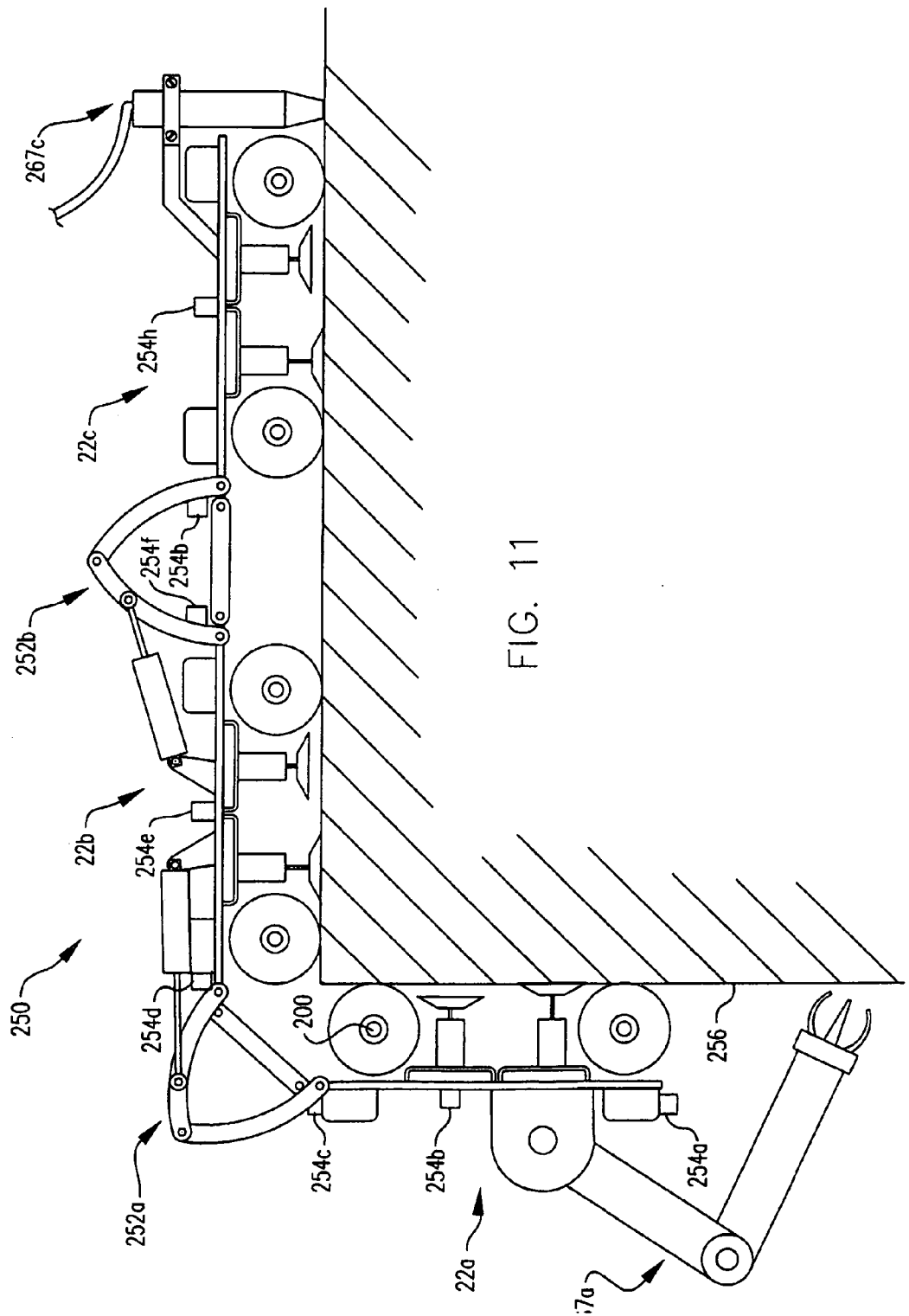
FIG. 11 is a side view of a train including three traction units in FIG. 1 traversing up around a corner and down a decline according to an embodiment of the invention.

The traction unit 22 can be combined with another traction unit/units 22 to form a train, as discussed with FIGS. 10 and 11. Such a train of units is capable of traversing obstructions on a surface like gaps or steps, or traversing abrupt changes in the contour of a surface like a corner between a wall and a floor or the location where a wing of an airplane meets the body. In addition, the units 22 can be tethered to each other or to a boom to prevent the units from damaging the surface should they happen to fall or fail to work cooperatively. For example, an area of a surface can be scanned by a scanning tool (not shown) mounted to a beam (not shown) that two units 22 support, or one unit 22 can carry a container of cleaning solution while another unit 22 carries a sprayer.

Figure 2:
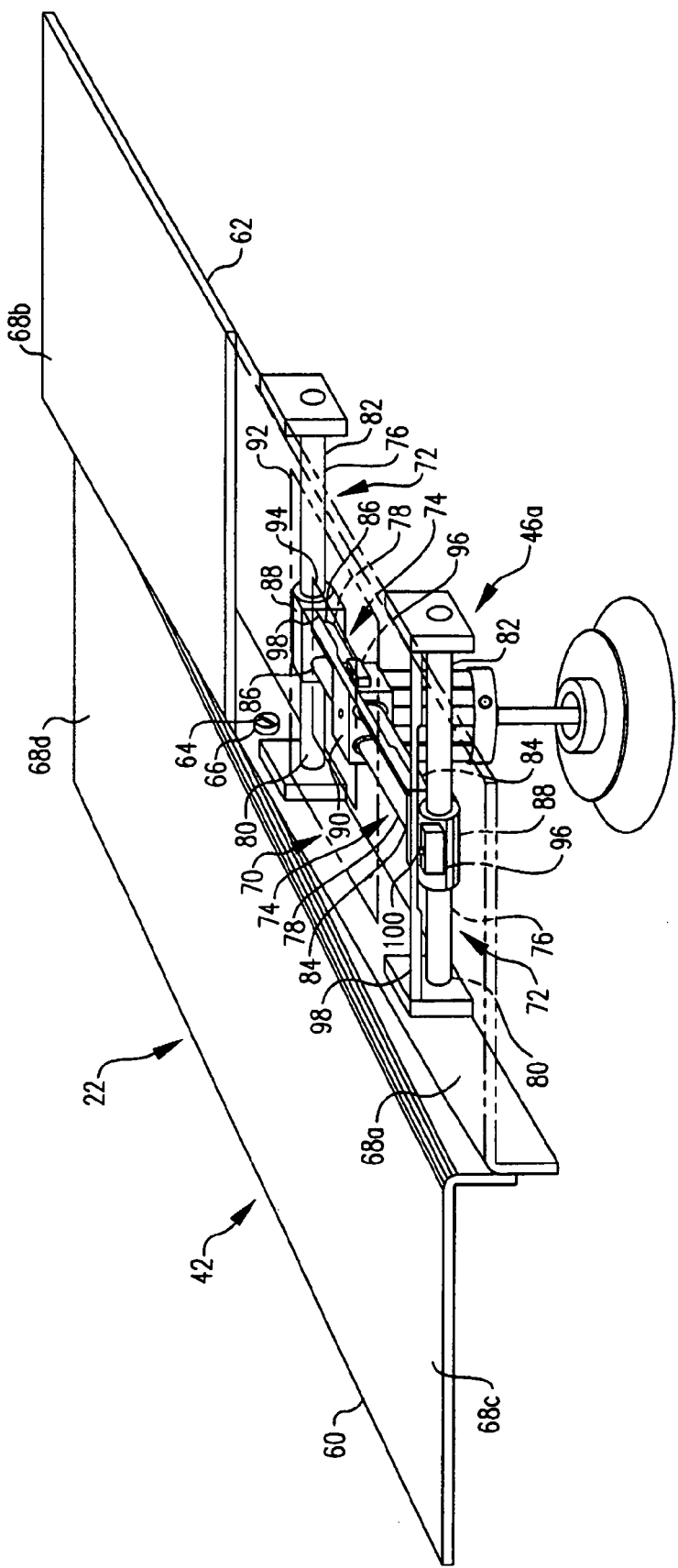
FIG. 2 is perspective view of a frame and adherence member included in the traction unit in FIG. 1 according to an embodiment of the invention.

FIG. 2 is perspective view of the traction unit 22 of FIG. 1 including the frame 42 and one adherence member 46a according to an embodiment of the invention. The remaining adherence members 46b-46d, trucks 50a-50d, return mechanisms 48a-48d and steering mechanisms 58a-58d have been omitted for clarity. But, it is understood that this illustration can also apply to the omitted adherence members 46b-46d.

Referring to FIG. 2, in one embodiment, the frame 42 includes two portions 60 and 62 that are pivotable about a center point 64 to promote stability of the traction unit 22 as it traverses a compound curved surface. A bolt 66 loosely threaded to a nut (not shown) after being inserted through both portions 60 and 62 fastens the portions 60 and 62 together. In other embodiments, conventional bearings (not shown) can be used to permit rotation between the portions. In one embodiment, each portion 60 and 62 is made from a conventional metal plate having a high strength to weight ratio such as aluminum. Each portion 60 and 62 includes two sections 68b-68d that divide the portions 60 and 62 into two equal or approximately equal areas. When the traction unit 22 traverses compound curved surfaces, the distance from the surface at each wheel (not shown) to the frame 42 is typically not the same for all four trucks (not shown) at any given instant in time. If the frame 42 did not have the additional flexibility provided by pivoting about the center point 64, the wheels on the trucks might lose contact with the surface and hinder the progress of the unit 22 across the surface.

Although, the portions 60 and 62 are shown and described as pivotable relative to each other about a center point 64, the portions may pivot about a point located elsewhere on the portions 60 and 62.

Still referring to FIG. 2, the frame 42 maintains the adherence member's alignment between the frame 42 and surface (not shown) underneath the frame 42 and supports the adherence member 46a as the member 46a moves within a translation zone 70. In one embodiment the frame 42 includes linear frame bearings 72 attachable to the frame 42 that movably support linear member-mount bearings 74 attachable to the adherence member 46a. Each bearing 72 and 74 includes a bearing guide 76 and 78 having first 80 and 84 and second 82 and 86 ends. The frame bearing guides 76 are attachable to the frame 42 and typically extend the width of a portion 60 or 62 of the frame 42. The member-mount bearing guides 78 are attachable to the frame bearing carriages 88 which are slidable relative to the frame bearing guides 76. The member-mount bearing carriage 90 is slidable relative to the member-mount guides 78 and is attachable to the adherence member 46a. By mounting the member-mount carriage 90 on both member-mount bearing guides 78, the adherence member 46a does not swing out of alignment between the frame 42 and surface when the traction unit 22 ascends or descends an incline or traverses a ceiling or inverted wall upside down.

The frame section 68a includes the translation zone 70 that defines the area in which the adherence member 46a moves relative to the frame 42 when the traction unit 22 traverses a surface (as previously discussed, the frame 42 actually moves while the adherence member 46a remains stationary). In one embodiment the translation zone 70 includes a hard limit 92 that defines the zone 70 and a soft limit 94 disposed within the hard limit 92 of the zone 70 and defined by limit switches 96 which may be magnetic reed switches, micro-switches or other conventional switches. The hard limit 92 is the adherence member's travel limit imposed by the frame carriages 88 contacting either end 80 or 82 of the frame guides 76, and the member-mount carriage 90 contacting the frame carriages 88 at either end 84 or 86 of the member-mount guides 78. The hard limit 92 prevents the adherence member 46a from moving relative to the frame 42 once it encounters the hard limit 92.

Still referring to FIG. 2, tripping one or both of the limit switches 96 warns the micro-processor in the control system 28 (FIG. 1) (not shown) that the adherence member 46a is close to a hard limit 92. Typically, the soft limit 94 is approximately half the distance from a center of the translation zone 70 and the hard limit 92, but may be any distance between the these two locations within the zone 70. In one embodiment, a switch 96 is attached to a frame carriage 88 and another switch 96 is attached to the member-mount carriage 90. Both switches 96 operate by riding a switch rail 98. Once the adherence member 46a encounters the soft limit 94, the switch rail 98 depresses the switch contact 100; but when the adherence member 46a is within the soft limit 94, the switch contact 100 remains extended.

Figure 3:
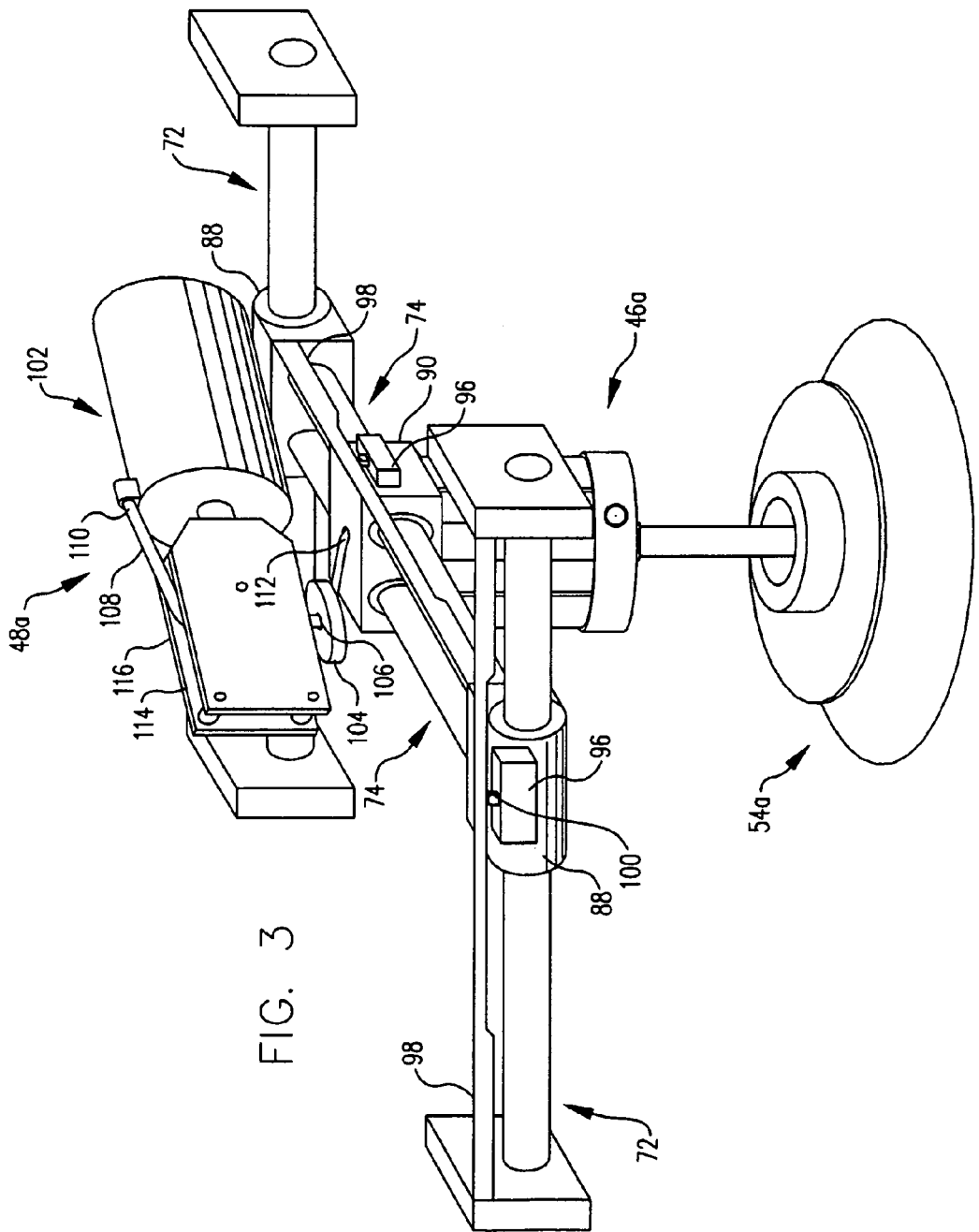
FIG. 3 is a perspective view of a return mechanism and adherence member included in the traction unit in FIG. 1.

FIG. 3 is a perspective view of the return mechanism 48a in FIG. 1 including a return bushing and cord. Although FIG. 3 illustrates one return mechanism 48a, one adherence member 46a, frame bearings 72 and member-mount bearings 74, it is understood that this illustration can also apply to the other return mechanisms 48b-48d, corresponding to the other adherence members 46b-46d in FIG. 1.

The return mechanism 48a moves the adherence member 46a relative to the frame 42 after the adherence member 46a releases the surface (not shown). In one embodiment, the return mechanism 48a is mounted to the frame by conventional fasteners and includes an actuator 102 selectively operable to move the adherence member 46a, a return bushing 104 attachable to a frame section (not shown) and having a hole 106 defining a return position typically in the center of the translation zone 70 (FIG. 2), and a return cord 108 attached to the actuator 102 at a first end 110, insertable through the hole 106 and attached to the member-mount carriage 90 at a second end 112. To move the adherence member 46a, the return mechanism 48a pushes the cord 108 away from the return bushing 104 by extending its ram 114. With the first end 110 of the cord 108 attached to the actuator 102, the second end 112 of the cord 108 is pulled toward the return bushing 104. To prevent the cord 108 from slipping off the ram 114, the ram 114 includes a cord guide 116 in which the cord 108 is disposed.

In operation, the control system's micro-processor typically commands the return mechanism 48a to move the adherence member 46a for a predetermined length of time. This length of time is typically three quarters (¾) of a second but may be more or less depending on the speed of the traction unit 22 as it traverses a surface (not shown) and the pressure of the air used to power the mechanism 48a. During this length of time, the pneumatic system 24 (FIG. 1) supplies high pressure air to the actuator 102 as discussed in greater detail in conjunction with FIG. 5. Although, the micro-processor keeps track of the length of time the actuator 102 operates, conventional sensors (not shown) such as micro-switches, magnetic reed switches or optical sensors may signal the micro-processor of the return of the adherence member 46a to the return position. If the return mechanism 48a does not finish returning the adherence member 46a to the return position before the mechanism 48a stops, the adherence member 46a merely stops moving relative to the frame 42 and commences extending its suction cup 54a to the surface.

Although the return position is discussed located in the center of the translation zone 70, the return position can be anywhere within the translation zone 70. In addition, although the cord guide 116 moves with the ram 114, the cord guide 116 can remain stationary while the ram 114 moves within it. Also, the ram 114 can include a tube through which the cord 108 runs to prevent the cord 108 from slipping off the ram 114.

Figure 4:
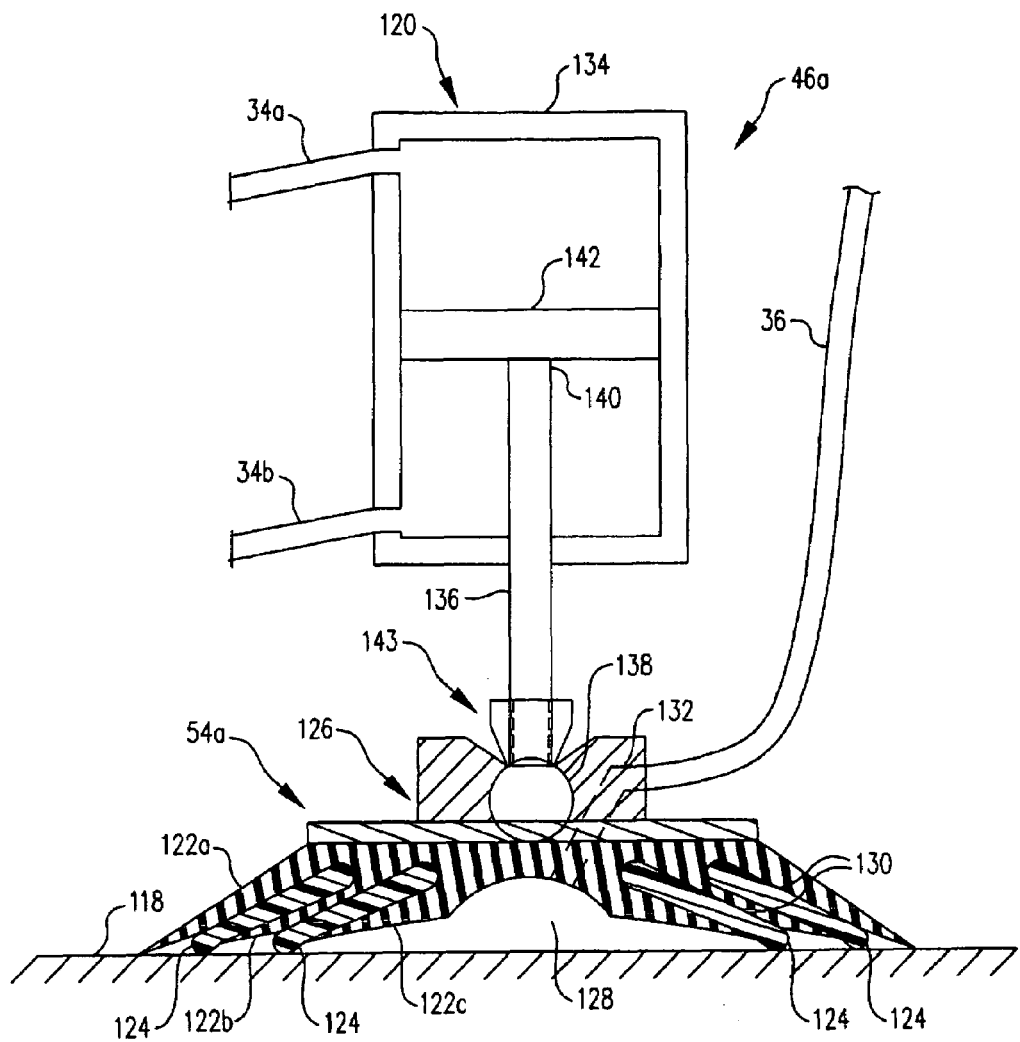
FIG. 4 is cross-sectional view of an adherence member in FIGS. 1-3 according to an embodiment of the invention.

FIG. 4 is cross-sectional view of the adherence member 46a in FIGS. 1-3 according to an embodiment of the invention. It is understood that this illustration can also apply to the other adherence members 46b-46d.

The adherence member 46*a* includes the suction cup 54*a* for attaching the adherence member 46*a* to a surface 118 and includes a body 120 operable to extend and retract the suction cup 54*a* to and from the surface 118. The suction cup 54*a* is pivotally attachable to the body 120 to allow the suction cup 54*a* to form a seal with a curved or canted surface (not shown). Thus, when the suction cup 54*a* initially touches a curved or canted surface a portion of the cup 54*a* touches the surface and, by continuing to extend the cup 54*a*, the body 120 causes the remaining portion of the cup 54*a* to contact the surface.

Still referring to FIG. 4, in one embodiment, the suction cup 54*a* includes three concentric lips 122*a*-122*c* and a soft viscous material 124 such as silicone or other conventional rubber with a very low durometer value to promote the formation and maintenance of a seal with rough or grooved surfaces. The lips 122*a*-122*c* extend from a backing plate 126 away from the body 120 and define an inner cavity 128 and lip chambers 130 that contain the soft viscous material 124. The inner cavity 128 includes a vacuum port 132 connected to the vacuum source 30 (FIG. 1) by the vacuum line 36. When the lips 122*a*-122*c* of the cup 54*a* contact the surface 118 they form a seal and create a vacuum in the inner cavity 128. This vacuum attaches the cup 54*a* to the surface 118 and squeezes the soft viscous material 124 into contact with the surface 118. As long as at least one of the lips 122*a*-122*c* forms a seal with the surface 118, the cup 54*a* can generate a vacuum and attach to the surface 118.

In other embodiments the suction cup 54*a* may include more or fewer lips that may or may not be concentric. In addition, the soft viscous material 124 may include fibrous material to increase the material's tensile strength.

The suction cup 54*a* can be made from any conventional resilient material such as rubber or plastic depending on the environment and type of surface the cup 54*a* will contact.

Still referring to FIG. 4, in one embodiment, the body 120 includes a conventional actuator 134 that reciprocates a rod 136 to extend and retract the suction cup 54*a* from the surface 118. The rod 136 has a first end 138 that pivotally attaches to the backing plate 126 of the suction cup 54*a* and a second end 140 attached to a piston 142. Conventional universal joints or ball-and-socket joints 143 typically attach the first end 138 to the suction cup 54*a*. By supplying the actuator 134 with pressured air via the lines 34*a* and 34*b*, as discussed below in conjunction with FIG. 5, the actuator 134 moves the suction cup 54*a* toward or away from the body 120.

In other embodiments the body 120 may include a conventional rotary actuator or some other conventional mechanism operable to move the suction cup 54*a* to and from the body 120.

Figure 5:
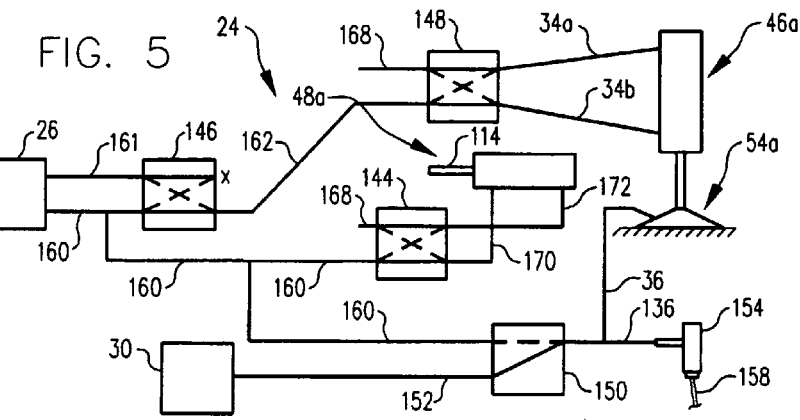
FIG. 5 is a block diagram of a pneumatic system included in the traction unit system of FIG. 1 according to an embodiment of the invention.

FIG. 5 is a block diagram of the pneumatic system 24 in FIG. 1 according to an embodiment of the invention. The system 24 powers the suction cup 54*a*, the return mechanism 48*a*, and adherence member 46*a* by distributing negative, low-positive, or high-positive pressurized air to these components. Although FIG. 5 illustrates the pneumatic system 24 powering one return mechanism 48*a*, one adherence member 46*a* and one suction cup 54*a*, it is understood that this illustration can also apply to the other return mechanisms 48*b*-48*d*, adherence members 46*b*-46*d* and suction cups 54*b*-54*d*.

Referring now to FIG. 5, the system provides air at three different pressures, negative or vacuum, low, and high, to the return mechanism 48*a*, adherence member 46*a* and suction cup 54*a* as directed by the micro-processor of the control system 28 (FIG. 1). The system 24 includes a return mechanism valve 144 for selectively supplying high pressure air to power the return mechanism 48*a*, a high/low pressure control valve 146 for selectively supplying low or high pressure air to an adherence-member control valve 148 that powers the piston 142 (FIG. 4) of the adherence member 46*a* to extend or retract the suction cup 54*a*, and a suction cup valve 150 for supplying a vacuum or high pressure air to the suction cup 54*a*. The system 24 also includes the vacuum source 30 (FIG. 1) connected to the suction cup valve 150 by the line 152 and is typically mounted apart from the traction unit 22 and a vacuum sensor 154 connected to the suction cup valve 150 and suction cup 54*a* by the line 156. The vacuum sensor 154 monitors the air pressure in the suction cup 54*a* and relays this information to the micro-processor via line 158. Line 160 connects the high/low-pressure control valve 146, return-mechanism valve 144, and suction-cup valve 150 to the source of pressurized air 26 typically mounted apart from the traction unit 22. Line 161 connects the high/low-pressure control valve to the source of pressurized air 26. Line 162 connects the high/low pressure control valve 146 to the adherence member control valve 148, which lines 164 and 166 connect to the adherence member 46*a*. Line 168 exhausts the system to the atmosphere.

In one embodiment, the high pressure is approximately 125 pounds per square inch (psi) above atmospheric pressure; the low pressure is approximately 10 psi, and the vacuum is approximately 11-12 psi below atmospheric pressure. However other pressure values may be used depending on the weight of the payload and/or type of surface traversed. The valves 144-150 are attached to the frame 42 (FIG. 1) and are separate from their respective mechanism 48*a*, member 46*a* or cup 54*a*. But, these valves 144-150 may be formed as a part of their respective mechanism 48*a*, member 46*a* or cup 54*a* or located apart from the traction unit 22.

Still referring to FIG. 5, as the traction unit 22 traverses the surface (not shown) the system 24 cycles the extension and retraction of the suction cup 54*a*, the return of the adherence member 46*a* as well as the attachment and release of the suction cup 54*a* to and from the surface. At a first moment in the cycle (the first moment is not necessarily first but simply picked as an arbitrary first moment for discussion purposes) the adherence member 46*a* hangs above the surface in its return position and the suction cup valve 150 connects the vacuum source 30 to the suction cup 54*a* via lines 152 and 36. With the suction cup 54*a* suspended above the surface, the vacuum draws in air from the atmosphere and the vacuum sensor 154 senses a small negative pressure in line 36. The micro-processor then connects the air pressure source 26 to the adherence member 46*a* by directing the high/low pressure control valve 146 to connect the line 161 supplying low pressure air to the line 162 and directing the adherence-member control valve 148 to connect the line 162 to the line 34*a*. Thus, the adherence member 46*a* extends the suction cup 54*a* to the surface. Once the suction cup 54*a* touches the surface, the cup 54*a* forms a seal with the surface and the vacuum sensor 154 senses an increase in negative pressure. Based on this information, the micro-processor connects the air pressure source 26 to the adherence member 46*a* by directing the high/low pressure control valve 146 to connect the line 160 supplying high pressure air to the line 162 and directing the adherence member control valve 148 to connect line 162 to line 34*b*. If, however the suction cup 54*a* fails to form a seal with the surface the adherence member 46*a* will continue to extend the suction cup 54*a* under low pressure and the adherence member 46*a* will simply remain stationary relative to the surface until it trips a limit switch 96 (FIG. 2). In other embodiments, the micro-processor instructs the adherence member 46a to retract the suction cup 54a, and the return mechanism 48a to move the adherence member 46a after a predetermined length of time lapses without the vacuum sensor 154 sensing an increase in negative pressure. With the suction cup 54a attached to the surface, the adherence member 46a can not retract the suction cup 54a, and thus instead secures the traction unit 22 to the surface by pulling the traction unit 22 toward the surface. With the adherence member 46a attached to the surface, the traction unit 22 moves relative to the member 46a until the member 46a trips a limit switch 96. Once tripped, the micro-processor connects the air pressure source 26 to the suction cup 54a with lines 36 and 160 to generate positive pressure in the suction cup 54a and blow the suction cup 54a off the surface. With the suction cup 54a blown from the surface and the adherence member 46a exerting a retraction force on the cup 54a, surface abrasion by the cup 54a during release is minimized. When a limit switch 96 is tripped, the micro-processor also connects the air pressure source 26 to the return mechanism 48a by directing the return mechanism valve 144 to connect the line 160 to the line 170 which causes the return mechanism 48a to extend its ram 114. After the return mechanism 48a runs for approximately three quarters (¾) of a second, the micro-processor directs the return mechanism valve 144 to connect line 160 to line 172 which causes the return mechanism 48a to retract its ram 114. The adherence member 46a is now back in a position similar to the first moment and the cycle can repeat.

In other embodiments, the system 24 may include an orientation sensor such as a conventional inclinometer or accelerometer to monitor the orientation of the traction unit 22 relative to the direction of gravity and a regulator to increase or decrease the vacuum and/or high air pressure. This allows one to adjust the amount of suction the cups 54a-54d forms with the surface and the retraction force in the adherence members 46a-46d when the traction unit 22 is traversing a ceiling or steeply inclined wall. For example, the traction unit 22 may be upside down as it traverses the underside of an airplane's aft body section. In addition, the vacuum generated at the suction cup 54a may be generated by blowing air through a venturi and connecting the vacuum port 132 (FIG. 4) of the suction cup 54a to an orifice in the side wall of the venturi.

FIG. 6 is a front view of the truck 50a in FIG. 1 including a motor, a body, two wheels and a drive shaft according to an embodiment of the invention. Although FIG. 6 illustrates one truck 50a, it is understood that this illustration can also apply to the other trucks 50b-50d (FIG. 1).

Referring to FIG. 6, the truck 50a propels and steers the traction unit 22 across a surface and includes a wheel motor 174 connected to two wheels 56a and 56b by a drive shaft 176 disposed within a truck body 178. In one embodiment, the wheel motor 174 is mounted to the frame 42 with conventional fasteners such as screws or bolts. A steering bearing mount 180 retains the steering bearing 182 and is attached to the frame 42 below the wheel motor 174. The steering bearing 182 supports a steering tube 184 mounted to the truck body 178 and permits the steering tube 184 to rotate relative to the bearing mount 180 and frame 42. Secured to the outer surface 186 of the steering tube 184, the steering sprocket 188 is attachable to the steering motor (not shown) via a conventional belt or chained links (not shown) that convey the power of the steering motor to the truck body 178 when a turn is desired. Extending downward from the wheel motor 174, an upper drive shaft 190 couples a lower drive shaft 192 to the wheel motor 174 via a conventional universal joint 193. A worm gear 194 attachable to the bottom of the lower drive shaft 196 engages a spur gear 198 attachable to an axle 200 to transmit the power from the motor 174 to the wheels 56a and 56b. The truck body 178 supports the axle 200 with conventional wheel bearings 201 that allow the axle 200 to rotate relative to the truck body 178. Conventional techniques (not shown) such as a castle nut and cotter pin, or bolts attach the wheels 56a to the axle 200 and transmit the rotation of the axle 200 to the wheels 56a.

In one embodiment the motor 174 is conventional electrical motor sized to provide enough power to the wheels 56a to propel the traction unit 22 up a 90 degree incline, and the wheels 56a are typically made of any material, such as Tygon®, that is chemically resistant to aviation hydraulic fluid. In other embodiments, the motor 174 may be a stepping motor or a pneumatic actuator whose power output can be varied, and the wheels can be made of any conventional material depending on the conditions of the environment and surface the traction unit 22 operates on.

Figure 7A:
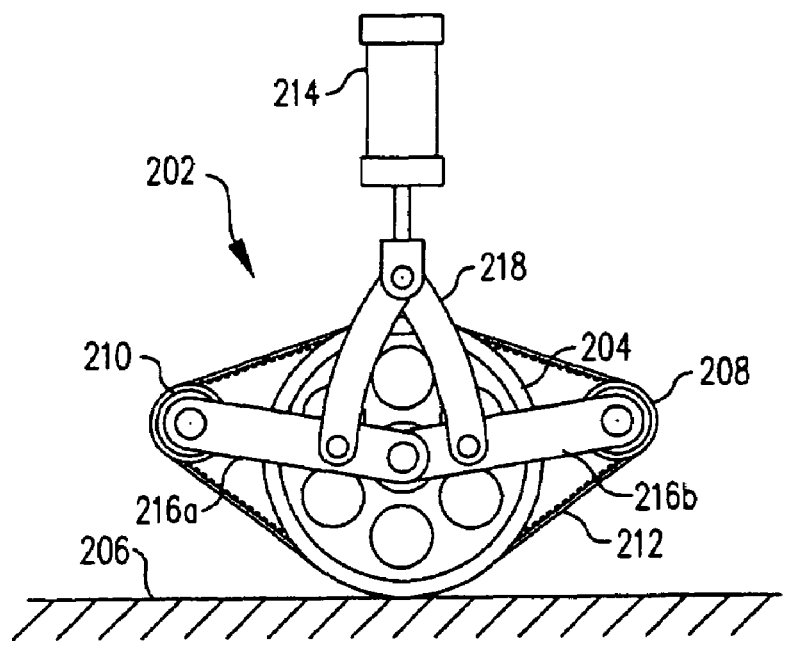
FIG. 7A is a side view of the truck in the FIGS. 1 and 6 including a bogie assembly according to an embodiment of the invention.
Figure 7B:
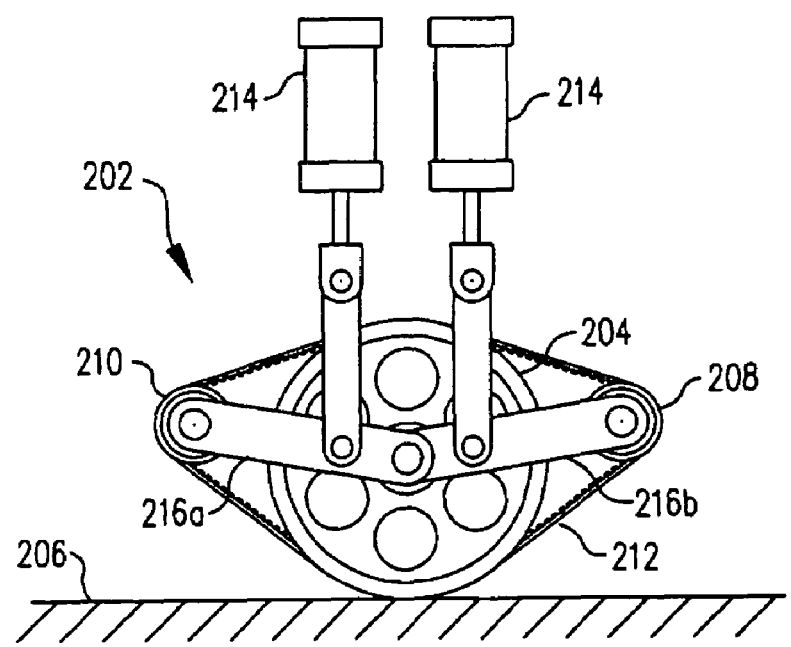
FIG. 7B is a side view of the truck in FIGS. 1 and 6 including a bogie assembly according to another embodiment of the invention.

FIG. 7A is a side view of the truck 50a in FIGS. 1 and 6 including a bogie assembly according to an embodiment of the invention. FIG. 7B is a side view of the truck 50a in FIGS. 1 and 6 including two bogie actuators according to another embodiment of the invention. In FIGS. 7A and 7B the truck motor, body and drive shaft in FIG. 6 have been omitted.

Referring to FIGS. 7A and 7B, the bogie assembly 202 typically provides more traction than the wheels 56a (FIG. 6) or other conventional wheels and typically allows the traction unit 22 to traverse obstacles that the wheels 56a (FIG. 6) or other conventional wheels normally could not. In one embodiment, the bogie assembly 202 includes a drive wheel 204 connected to the wheel motor 174 (FIG. 6) (not shown) that propels the truck 50a and thus the frame 42 (FIG. 1) (not shown) across a surface 206, a first and second bogie 208 and 210 pivotable about the drive wheel 204, and a belt 212 connected to the drive wheel 204 and bogies 208 and 210. One or more actuators 214 connected to bogie links 216a and 216b move the bogies 208 and 210 toward or away from the surface 206. Depending on the surface being traversed, the belt 212 can be any conventional resilient material such as rubber or plastic, or the belt 212 can be linked metal chain. With the bogies 208 and 210 extended such that they compress the belt 212 between themselves and the surface 206, the area of the belt 212 that contacts the surface 206 typically extends from one bogie 208 to the other 210 and at a minimum includes the area contacting each bogie 208 and 210, drive wheel 204 and the surface 206. With more contact area, the traction unit 22 has more traction. The bogie assembly 202 overcomes obstacles conventional wheels normally can not by placing a portion of the belt 212 on the obstacle and allowing the drive wheel 204 to climb up the belt 212 much like a tank going over a fallen tree whose diameter is greater than any of the tanks wheels.

Referring to FIG. 7A, in one embodiment, a wishbone link 218 connects the actuator 214 to the two bogie links 216a and 216b. In this arrangement the bogies 208 and 210 do not pivot about the drive wheel 204 independently of each other. Referring to FIG. 7B, in another embodiment, each bogie link 216a and 216b has an actuator 214 connected to it, which allows each bogie 208 and 210 to pivot independently about the drive wheel 204. This allows an operator to place a bogie 208 or 210 against the surface 206 and create additional traction without placing the other bogie against the surface such as when the other bogie is damaged or prevented from contacting the surface.

Figure 8:
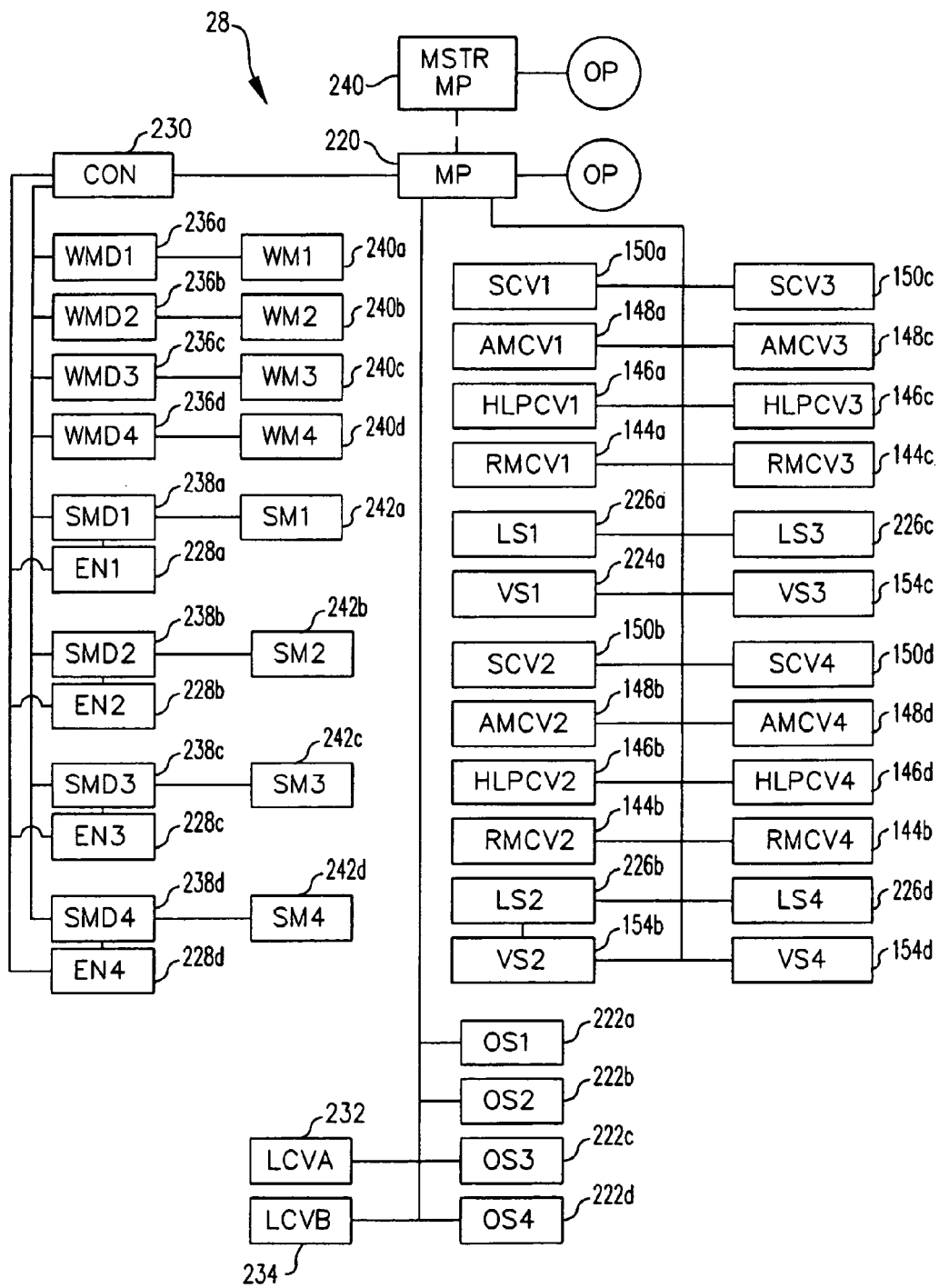
FIG. 8 is a block diagram of a control system included in the traction unit system of FIG. 1 according to an embodiment of the invention.

FIG. 8 is a block diagram of the control system 28 in FIG. 1 according to an embodiment of the invention. The control system 28 automatically controls the various components on the traction unit 22 (FIG. 1) and also allows an operator to control the unit 22. The blocks identified by a name ending with the same number refer to components associated with each other in a common frame section 68a-68d (FIG. 2). For example, the extension or retraction of an adherence member in one frame section is controlled by the adherence member control valve (AMCV1) and the return mechanism that moves the same adherence member is controlled by the return mechanism control valve (RMCV1). Although the following discusses the control system by referring to the components common to a single frame section, the discussion applies to the other components common to the other frame sections.

Referring to FIG. 8, in one embodiment the control system 28 includes a micro-processor (MP) 220 that receives signals from an operator (OP), obstruction and vacuum sensors (OS1 and VS1) 222a and 224a, a limit switch (LS1) 226a and an encoder (EN1) 228a directly and via a controller (CON) 230, and instructs the valves (suction-cup valve, SCV1, adherence-member control valve, AMCV1, high/low-pressure control valve, HLPCV1, return-mechanism control valve, RMCV1, and lift control valves, LCVA and LCVB, if applicable) 126a-150a and 232 and 234, wheel-motor and steering-motor drivers (WMD1 and SMD1) 236a and 238a and wheel and steering motors (WM1 and SM1) 240a and 242a in response to signals it receives. In one embodiment, the system 28 may automatically control the components of the traction unit 22 without receiving instructions from an operator. In other embodiments, the control unit 28 may control some or all of the components of the traction unit 22 from instructions it receives from an operator.

Still referring to FIG. 8, the MP directs the operation of an adherence member 46a (FIG. 1) as follows. At a first moment in the cycle (the first moment is not necessarily first but simply picked as an arbitrary first moment for discussion purposes) the adherence member 46a hangs above the surface in its return position and the MP 220 instructs the AMCV1 148a and the HLPCV1 146a to pressurize the adherence member 46a to extend the cup 54a (FIG. 1). Next, the MP 220 waits for the VS1 154a to signal the suction cup's attachment to the surface by signaling an increase in negative pressure. Once this signal is received, the MP 220 instructs the AMCV1 148a and HLPCV1 146a to pressurize the adherence member to retract the cup 54a and thus pull the wheels 56a-56d (FIG. 1) against the surface. The frame 42 (FIG. 1) now moves relative to the adherence member 46a, which eventually trips a LS1 226a that defines the soft limit 94 (FIG. 2). The MP 220 records this event and compares the timing of this event against other current similar events by the other adherence members 46b-46d in the traction unit 22. If another event occurred prior to this one, the MP 220 will release the other adherence member 46b-46d that caused the event from the surface before releasing the adherence member 46a. Otherwise, the MP 220 instructs the SCV1 150a to pressurize the suction cup 54a to a pressure greater than atmospheric pressure to release the adherence member 46a. Immediately after this, typically a fraction of a second later, the MP 220 instructs the RMCV1 144a to pressurize the return mechanism 48a (FIG. 1) to move the adherence member 46a to the return position. As previously discussed, in one embodiment the return mechanism 48a operates for approximately ¾ of second at which time the MP instructs the RMCV1 144a to pressurize the mechanism 48a to stop moving the member 46a.

Still referring to FIG. 8, in one embodiment the MP 220 coordinates the attachment and release of the adherence members 46a-46d to the surface such that the traction unit 22 has at least one adherence member 46a-46d attached to the surface at any give time while it traverses the surface. If the MP 220 determines that the release times of all the adherence members 46a-46d are converging to one point in time, the MP 220 will pause the suction cup extension of one two or three adherence members 46a-46d as the traction unit 22 continues to move across the surface. Alternatively, the MP 220 can halt the movement of the traction unit 22 across the surface and move the timing of one, two or three adherence members 46a-46d to various positions within their attachment and release cycle.

Still referring to FIG. 8, in one embodiment, the MP 220 also directs the operation of the trucks 50a-50d as follows. The MP 220 receives and analyzes information from the controller (CON) 230 and operator, and instructs the CON 230 accordingly. The CON 230 then locally directs the wheel motor driver (WMD1) 236a and steering motor driver (SMD1) 238a from signals received from the encoder (EN1) 228a. The WMD1 236a controls the operational parameters of the wheel motor (WM1) 240a such as power and speed. The SMD1 238a controls the operational parameters of the steering motor (SM1) 242a such as turning the wheels 56 a (FIG. 1). The EN1 228a communicates positional data of the traction unit 22 to the CON 230, which the CON 230 then compares with the instructions received from the MP 220 and instructs the motor drivers 236a and 238a accordingly. In addition, if an adherence member 46a-46d contacts a hard limit 92 (FIG. 2), the MP 220can stop the WM1 240a to prevent scrubbing and then move the adherence member 46a to a return position.

Still referring to FIG. 8, if multiple traction units 22 are combined to form a train (discussed in conjunction with FIGS. 10, 11 and 13), the control system will typically include a master micro-processor (MSTRMP) 240 to coordinate the operation of the MPs 220 of each traction unit 22. Alternatively, the MSTRMP 240 may replace the individual MPs 220 and the operator would then control the train via the MSTRMP 240. In response to the obstruction sensor (OS1) 222a notifying the MP 220 of an obstruction, inclination or declination, either the MSTRMP 240 or MP 220 instructs the link control valve (LCVA) 232 to pressurize the link actuator accordingly (discussed in greater detail in conjunction with FIGS. 10 and 11). In addition, and as previously discussed herein, the MP 220 may also monitor the orientation of the adherence member 46a relative to gravity with a conventional inclinometer or accelerometer, and adjust the vacuum within the suction cup 54a accordingly.

Figure 9A:
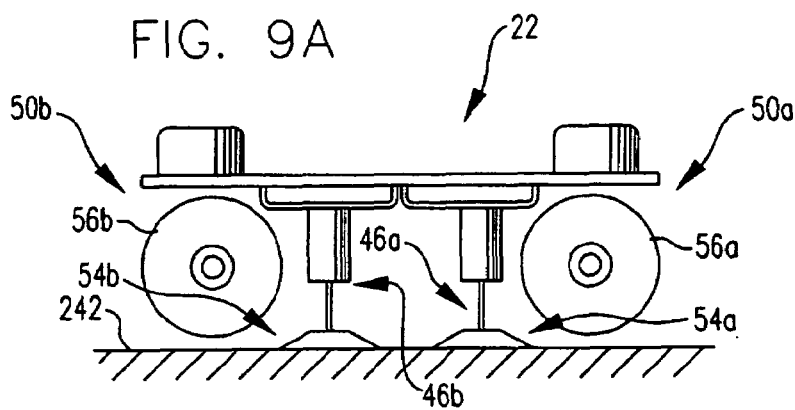
Figure 9B:
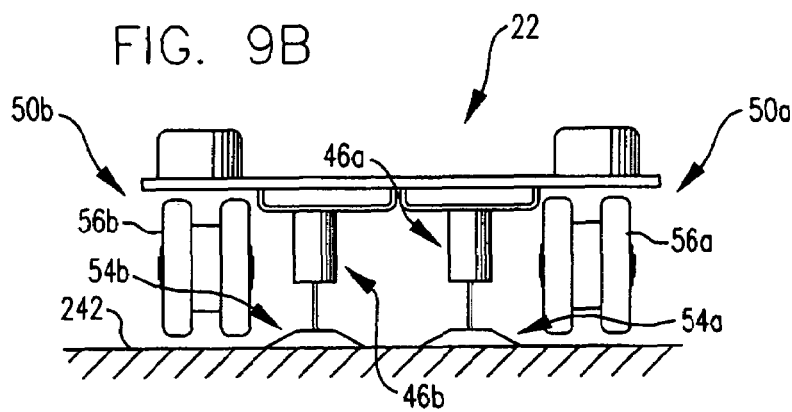
Figure 9C:
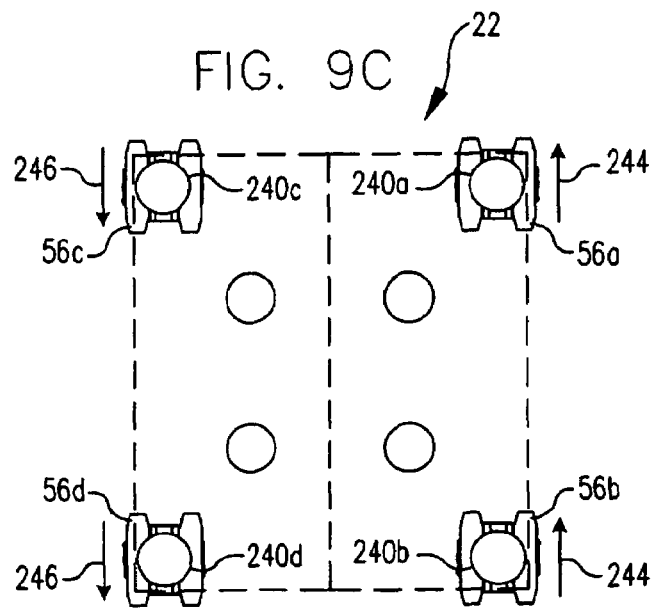

FIGS. 9A-9F are views of the traction unit 22 of FIG. 1 performing three types of turns according to an embodiment of the invention. FIGS. 9A and 9B show the traction unit 22 performing a standing turn. FIGS. 9C and 9D show the traction unit 22 performing a pivot turn. FIGS. 9E and 9F show the traction unit 22 performing a radius turn.

Referring to FIGS. 9A and 9B, the standing turn allows an operator to change the direction of the traction unit 22 without the wheels 56a-56d of the trucks 50a-50d touching the surface 242. This type of turn allows the traction unit 22 to change directions without scrubbing—abrading the surface 242 as the wheels 56a-56d attempt to change the unit's direction of travel—the surface 242 and without changing its alignment relative to the surface 242. Scrubbing often produces scratches on a surface, which can cosmetically or structurally damage a surface, and becomes more prevalent the slipperier a surface becomes. Maintaining the same alignment is important for some types of work or inspection applications.

Still referring to FIGS. 9A and 9B, to perform a standing turn, the MP 220 (FIG. 8) or operator instructs the adherence members 46a-46d (46c and 46d not shown) to attach their suction cups 54a-54d (54c and 54d not shown) if the cups 546-54d are not already attached to the surface 242. Once the cups 54a-54d are attached, the adherence members 46a-46d further extend their cups 54a-54d against the surface 242. This causes the wheels 56a-56d (56c and 56d not shown) of the trucks 50a-50d (50c and 50d not shown) to lift away from the surface 242. Next, the operator or MP 220 turns the wheels 56a-56d of the trucks 50a-50d, and then retracts the suction cups 54a-54d causing the traction unit's turned wheels 56a-56d to again contact the surface 242.

Although the standing turn is described and shown as turning all the wheels 56a-56d of the traction unit 22 to point in the same direction, the wheels 56a-56d may be turned to point in different directions.

Referring to FIGS. 9C and 9D, the pivot turn allows the traction unit 22 to rotate about any point within the traction unit 22 without traversing the surface (not shown). To accomplish this turn the operator or MP 220 can instruct two adjacent wheel motors 240a and 240b to drive their corresponding wheels 56a and 56b forward while instructing the remaining wheel motors 240c and 240d to drive their corresponding wheels 56c and 56d in the opposite direction, as shown in FIG. 9C. Alternatively, the operator or MP 220 can instruct all the steering motors (not shown) to turn their corresponding wheels 56a-56d as shown in FIG. 9D and instruct the wheel motors 240a-240d to drive the wheels 56a-56d in the appropriate direction.

Referring to FIGS. 9E and 9F, the radius turn allows the traction unit 22 to rotate about a point outside the traction unit 22 as the unit 22 traverses a surface (not shown). The turn shown in FIG. 9E is similar to a conventional car turning right around a corner and causes the turned wheels 56a and 56c to scrub the surface. The turn shown in FIG. 9F typically does not cause the wheels 56a-56d to scrub the surface. However, to perform this radius turn without scrubbing any of the wheels 56a-56d on the surface, the turn radius and speed of the outside wheels 56a and 56c must be greater than the turn radius and speed of the inside wheels 56b and 56d.

FIGS. 10 and 11 are side views of three traction units 22a-22c of FIG. 1 linked together to form a train 250 according to an embodiment of the invention. FIG. 10 shows the train 250 including two link assemblies 252a and 252b and traversing up an incline. FIG. 11 shows the train of FIG. 10 traversing a decline.

Referring to FIGS. 10 and 11, in one embodiment, the train 250 includes a first link assembly 252a operable to pivot the a first or lead traction unit 22a up or down relative to a second or middle traction unit 22b, and a second link assembly 252b operable to pivot a third or trail traction unit 22c up or down relative to the middle traction unit 22b. The train 250 also includes obstruction sensors 254a-254h mountable to each unit 22a-22c and operable to sense obstructions on the surface 256 such as gaps, steps or protrusions, and any substantial inclination or declination in the surface 256 about to be traversed. The first link assembly 252a includes a pivot link 258a pivotally attached at one end to the rear 260a of the lead unit 22a and pivotally attached at the other end to the front 262b of the middle unit 22b. The link assembly 252a also includes two actuator links 264a and 264b that are pivotally attached to each other at one of their ends and attached to either the rear 260a of the lead unit 22a or front 262b of the middle unit 22b, and a link actuator 266a that is also pivotally linked to the middle unit 22b and the actuator link 264b. Conventional techniques such as bolts insertable through bushings or ball, needle or journal bearings, can be used to pivotally attach the links 258a, 264a and 264b and the actuator 266 to each other as well as corresponding traction units 22a-22c. The second link assembly 252b is configured similar to the first link assembly 252a. The obstruction sensors are typically conventional proximity sensors using sound or light to sense impending obstructions and notify the micro-processor 220 (FIG. 8).

Still referring to FIGS. 10 and 11, In one embodiment, the train 250 also includes tools 267a and 267b mounted to traction units 22a and 22c. The tools 267a and 267b can be any conventional tool such as an inspection probe 267c or arm with a claw 267a as desired.

Still referring to FIG. 10, when obstruction sensor 254a senses a substantial inclination, the sensor 254a notifies the MP 220. The MP 220 then instructs the adherence members 46a-46d of the lead unit 22a to release the surface 256 as previously discussed in conjunction with FIG. 5. Next, the MP 220 instructs the pneumatic system 24 of FIG. 5 to supply pressurized air to the link actuator 266 to pivot the lead unit 22a above the inclined surface 252. Next the MP 220 extends the suction cups 54a-54d of the adherence members 46a-46d of the lead unit 22a and instructs the middle and trail units 22b and 22c to propel the lead unit 22a to the inclined surface 252. Once the suction cups 54a-54d contact the surface 252 and establish a seal, the MP 220 instructs the lead unit 22a to propel the train 250 up the incline.

Referring to FIG. 11, the same operational sequence previously discussed is used to propel the train around and down a 90 degree decline. But, when the traction unit 22a descends the decline the middle and trail units 22b and 22c retard the speed of the train 250 as it moves down the decline.

Still referring to FIG. 11 the sensors 254a-254h can also be made to sense a gap (not shown) deep and wide enough to typically prevent the train 250 from traversing the surface 256. When such a gap is encountered the operational sequence previously described is used, but in this instance the link actuator 266a suspends the lead traction unit 22a over the gap as the middle and trail units 22b and 22c propel the train 250. Then, once the obstruction sensor 254a notifies the MP 220 (FIG. 8) that the lead unit 22a has passed the gap, the MP 220 instructs the link actuator 266a to lower the lead unit 22a back to the surface 256. To suspend and propel the middle unit 22b over the gap, the adherence members 46a-46d of the middle unit 22b are released from the surface and both link actuators 266a and 266b suspend the middle unit 22b over the gap by preventing one or more of the middle unit's trucks 50a-50d from dropping into the gap. In other embodiments the link actuators 266a and 266b may include locks operable to prevent the middle unit 22b from dropping into the gap.

Although, the train 250 is shown and described as formed by linking the traction units 22a-22c front to rear with respect to each other, the train 250 can be formed by linking the units 22a-22c side to side with respect to each other. Furthermore the link assemblies 252a and 252b may attach to one or more of the wheel axles 200 (FIG. 6) of the different traction units 22a-22c or a combination of the wheel axles 200 and frame 42 (FIG. 1). Also, two or more link assemblies 252a and 252b may attach one of the units 22a-22c to another unit 22a-22c instead of merely one as shown and discussed above.

Figure 12:
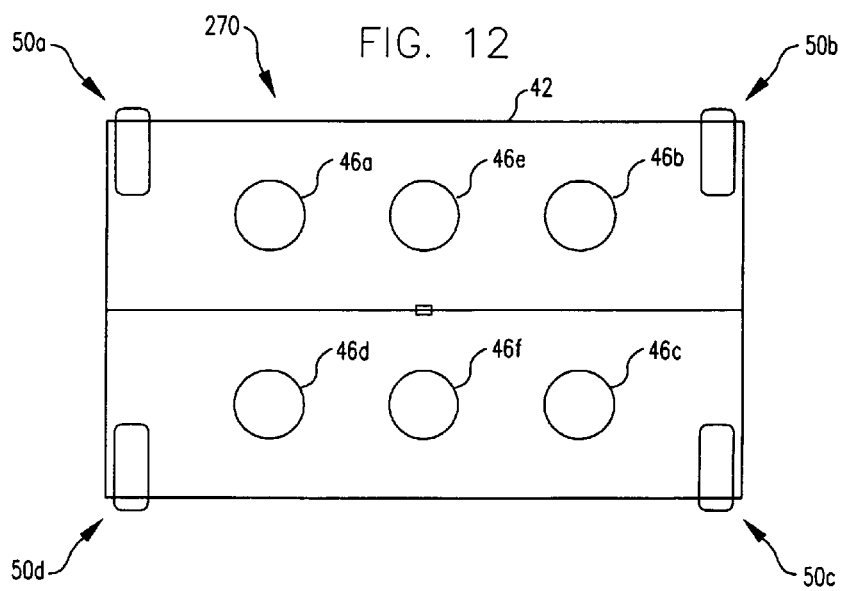
FIG. 12 is a top view of a traction unit including six adherence members according to another embodiment of the invention.

FIG. 12 is a top view of a traction unit 270 including six adherence members 46a-46f according to an embodiment of the invention. In one embodiment, the additional adherence members 46e-46f may be operable to secure the traction unit 270 to the surface as the unit 270 traverses the surface (not shown). In such an arrangement, the additional adherence members 46e-46f cycle through an attachment, release and return operation similar to operations previously discussed in conjunction with FIGS. 1, 5 and 8. Furthermore, in this arrangement the cycling of the additional adherence members 46e-46f are typically monitored by the MP 220 (FIG. 8) with respect to the other adherence members 46a-46d to help ensure at least one adherence member 46a-46f is attached to the surface while the unit 270 traverses the surface.

In another embodiment, the additional adherence members 46e-46f may be operable to merely help attach the traction unit 270 to the surface while the unit 270 is stationary. For example, if the unit 270 is suspended upside down or carries a payload including a drill to work on a specific location of the surface, the unit 270 may require more force to secure it to the surface than the other adherence members 46a-46d can provide alone. In such a situation, the additional adherence members 46e-46f may be attached to the frame 42 such that they do not move relative to the frame as the unit 270 traverses a surface. In such an arrangement, the additional adherence members 46e-46f are typically suspended above the surface as the unit 270 moves to the work location. Once at the location the operator or MP 220 typically instructs the additional adherence members 46e-46f to extend their suction cups 54a-54f to the surface and form a seal similar to the other adherence members 46a-46d. Thus, the unit 270 is more securely attached to the surface. Furthermore, on inclines where the trucks 50a-50d are not able to prevent the unit 270 from unwanted movement down the incline, the additional adherence members 46e-46f can help prevent the unit 270 from moving.

Although two additional adherence members 46e-46f are shown, more may be added to further secure the traction unit 270 to the surface.

FIG. 13 is a top view of two trains of traction units linked side by side according to another embodiment of the invention. Train 272 and train 274 are similar to the train 250 discussed in conjunction with FIGS. 10 and 11 except each traction unit 270 includes six adherence members 46a-46f like the unit 270 discussed in conjunction with FIG. 12. Link assemblies 274 are similar to the link assemblies 252a and 252b discussed in conjunction with FIGS. 10 and 11 and attach train 272 to train 274. By linking two trains 272 and 274 side by side, a large and heavy payload can be easily moved across a surface and/or secured to a work location on the surface.

Figure 14:
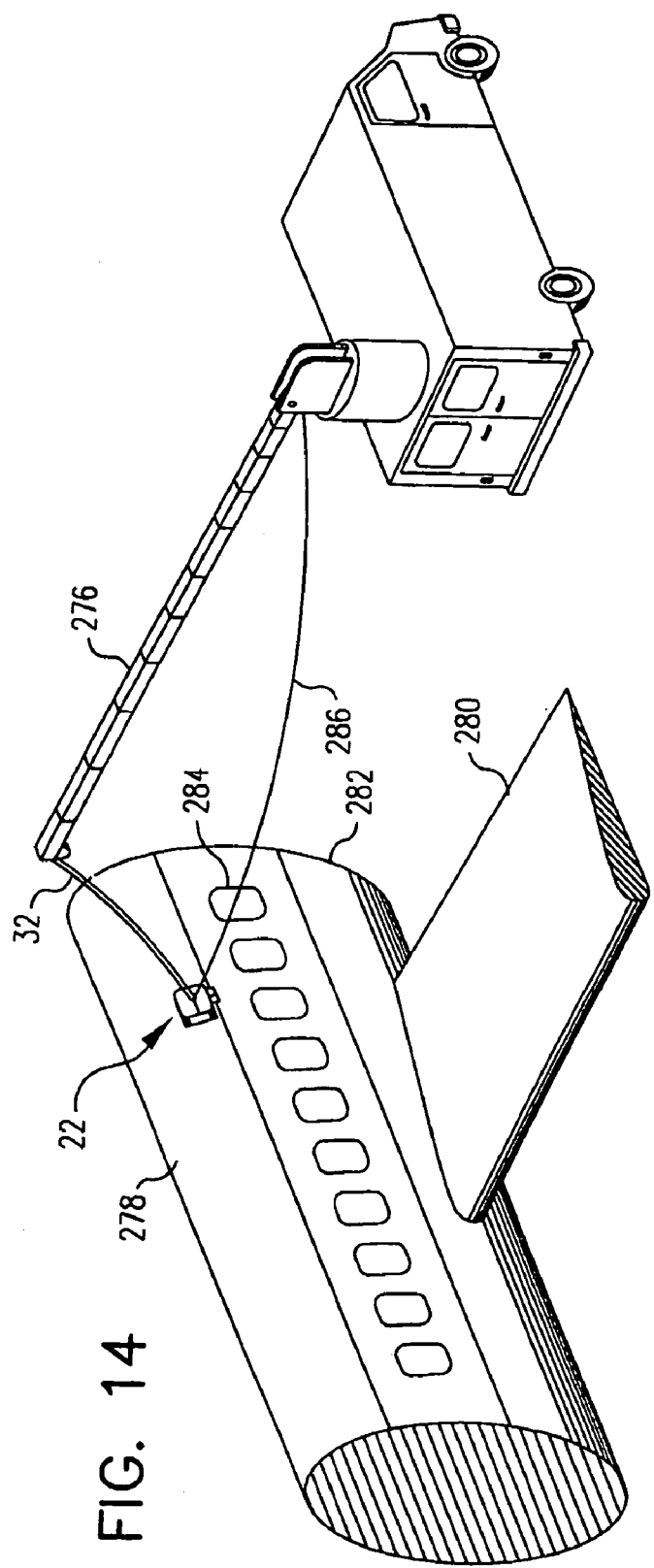
FIG. 14 is a perspective view of a traction unit in FIG. 1 tethered to a boom and traversing an airplane.

FIG. 14 is a perspective view of the traction unit 22 of FIG. 1 tethered to a boom 276 as it traverses an airplane fuselage 278. Tethering the unit 22 to the boom 276 allows the operator of the unit 22 to place the unit 22 near a desired location on the airplane fuselage 278 or other surface as applicable and have the unit 22 traverse a short distance to the desired location instead of placing the unit 22 on the wing 280 or bottom 282 of the fuselage 278—typical locations on the airplane within easy, unassisted reach of the operator—and waiting for the unit 22 to travel a long distance to the desired location. In addition, tethering the unit 22 to the boom 276 allows the operator to prevent costly damage to other structures of the airplane like the wing 280, window 284, or fuselage 278 if the traction unit 22 should happen to fall from the fuselage 278.

The umbilical cord 32 connects the traction unit 22 to the pneumatic system 24 (FIG. 1) and control system 28 (FIG. 1) as previously discussed in conjunction with FIG. 1 and includes a tether 40 (FIG. 1) which can be any conventional material strong enough to catch the unit 22 in free fall and can be attached to the boom 276 and traction unit 22 using conventional techniques such as a bolt or a hook. The anti-swing rope 286 prevents the unit 22 from swinging back into the fuselage 278 by automatically retracting should the traction unit 22 happen to fall. The boom 276 can be any conventional boom or similar to the boom discussed in U.S. Pat. No. 4,417,424, which is incorporated by reference.

Figure 15:
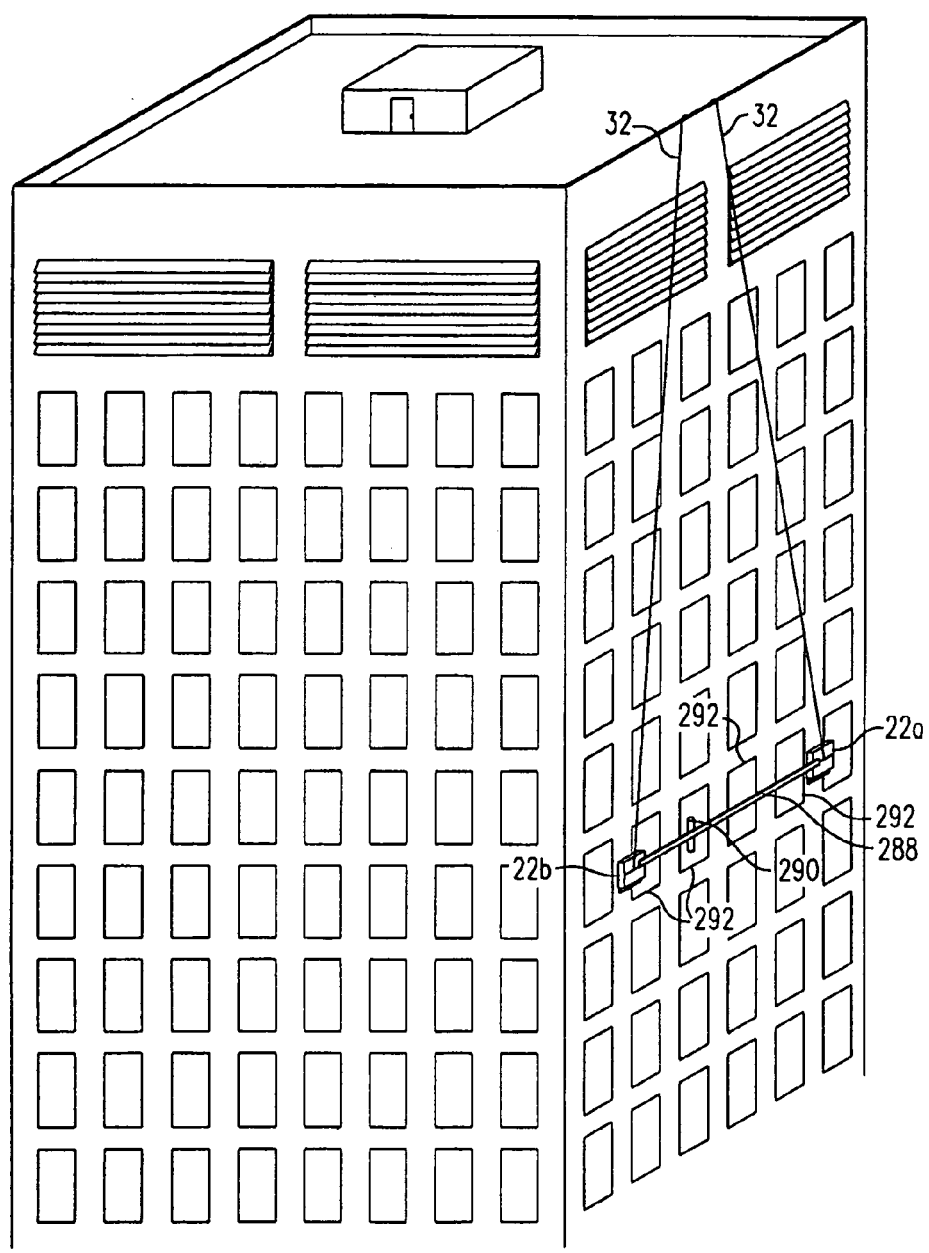
FIG. 15 is a perspective view of two traction units in FIG. 1 tethered to the top of a building and cooperatively working.

FIG. 15 is a perspective view of two traction units 22a and 22b of FIG. 1 tethered to the top of a building and working cooperatively. The tethers 40 (FIG. 1) in the umbilical cords 32 prevent costly damage to the building and people below the traction units 22a and 22b should the traction units 22a and 22b happen to fall. The traction units 22a and 22b support the beam 288 which in turn supports a window washing tool 290 that can be moved along the beam 288 in the direction of either unit 22a and 22b. In this arrangement the traction units 22a and 22b can wash more than one window 292 without moving to each window 290. In other embodiments, the beam 288 may support other tools such as an inspection probe or drill.

From the foregoing it will be appreciated that, although specific embodiments of the invention have been described herein for purposes of illustration, various modifications may be made without deviating from the spirit and scope of the invention.

What is claimed is:

1. A method of traversing a surface, comprising:
   attaching an adherence foot to the surface;
   pulling a frame having a translation zone and a drive wheel against the surface by pulling the adherence foot and frame toward one another;
   moving the frame relative to the attached adherence foot, whereby a body of an adherence member moves in more than two directions within the translation zone of the frame;
   releasing the adherence foot from the surface; and
   returning the released adherence foot to a return position.

2. The method of claim 1 wherein attaching an adherence foot includes generating a vacuum between the adherence foot and the surface.

3. The method of claim 1 wherein releasing the adherence foot from the surface includes generating air pressure greater than atmospheric pressure between the adherence foot and the surface to blow the adherence foot from the surface.

4. The method of claim 1 wherein
   releasing the adherence foot from the surface occurs before the body contacts a hard limit that prevents the frame from moving relative to the body.

5. The method of claim 1
   further comprising stopping the frame from moving relative to the attached adherence foot when the body contacts a hard limit and the adherence foot remains attached to the surface.

6. The method of claim 1 wherein moving the frame relative to the attached adherence foot includes
   crossing with the body a soft limit that signals the location of the frame relative to the body before the body contacts a hard limit.

7. The method of claim 1 wherein
   releasing the adherence foot from the surface includes releasing the adherence foot after the body crosses a soft limit but before the adherence member contacts a hard limit.

* * * * *